United States Patent
Kim et al.

(10) Patent No.: US 11,238,998 B2
(45) Date of Patent: Feb. 1, 2022

(54) COOLING FACILITY IN A REACTOR VESSEL AND ELECTRIC POWER GENERATION SYSTEM

(71) Applicants: KOREA ATOMIC ENERGY RESEARCH INSTITUTE, Daejeon (KR); KING ABDULLAH CITY FOR ATOMIC AND RENEWABLE ENERGY, Riyadh (SA)

(72) Inventors: Youngin Kim, Daejeon (KR); Seungyeob Ryu, Daejeon (KR); Joohyung Moon, Daejeon (KR); Soojai Shin, Sejong (KR); Seok Kim, Daejeon (KR); Hyunjun Cho, Daejeon (KR); Juhyeon Yoon, Daejeon (KR); Kilsung Kwon, Seoul (KR)

(73) Assignees: KOREA ATOMIC ENERGY RESEARCH INSTITUTE, Daejeon (KR); KING ABDULLAH CITY FOR ATOMIC AND RENEWABLE ENERGY, Riyadh (SA)

(*) Notice: Subject to any disclaimer, the term of this patent is extended or adjusted under 35 U.S.C. 154(b) by 127 days.

(21) Appl. No.: 16/615,204

(22) PCT Filed: May 23, 2018

(86) PCT No.: PCT/KR2018/005827
§ 371 (c)(1),
(2) Date: Nov. 20, 2019

(87) PCT Pub. No.: WO2018/217001
PCT Pub. Date: Nov. 29, 2018

(65) Prior Publication Data
US 2020/0161011 A1 May 21, 2020

(30) Foreign Application Priority Data
May 24, 2017 (KR) .......................... 10-2017-0064356

(51) Int. Cl.
*G21D 3/04* (2006.01)
*F22B 35/00* (2006.01)
(Continued)

(52) U.S. Cl.
CPC .............. *G21D 3/04* (2013.01); *F22B 35/004* (2013.01); *G21C 1/326* (2013.01); *G21C 9/016* (2013.01);
(Continued)

(58) Field of Classification Search
CPC .. G21D 3/04; G21D 1/00; G21D 1/04; G21D 5/02; G21D 5/00; F22B 35/004;
(Continued)

(56) References Cited

U.S. PATENT DOCUMENTS 4,130,459 A * 12/1978 Parker ................. G21C 9/00
376/280
4,239,596 A * 12/1980 Bevilacqua ............ G21C 15/18
376/299
(Continued)

FOREIGN PATENT DOCUMENTS

JP   2013-148438 A   8/2013
KR   20130012310 A   2/2013
(Continued)

OTHER PUBLICATIONS

International Search Report dated Sep. 19, 2018 issued in PCT/KR2018/005827.

*Primary Examiner* — Darlene M Ritchie
(74) *Attorney, Agent, or Firm* — Scully Scott Murphy and Presser

(57) ABSTRACT

An in-vessel cooling and power generation system according to the present disclosure may include a small scale reactor vessel, a heat exchange section provided inside the reactor vessel, and formed to supply supercritical fluid to (Continued)

receive heat from a reactor coolant system in the reactor vessel, an electric power production section comprising a supercritical turbine formed to produce electric energy using the energy of the supercritical fluid whose temperature has increased while receiving heat from the reactor coolant system, a cooling section configured to exchange heat with the supercritical fluid discharged after driving the supercritical turbine to shrink a volume of the supercritical fluid, wherein the supercritical fluid that has received heat from the reactor coolant system in the heat exchange section is formed to circulate through the electric power production section, and the cooling section.

21 Claims, 12 Drawing Sheets

(51) Int. Cl.

| | | |
|---|---|---|
| *G21C 1/32* | (2006.01) | |
| *G21C 9/016* | (2006.01) | |
| *G21C 15/12* | (2006.01) | |
| *G21C 15/18* | (2006.01) | |
| *G21D 1/00* | (2006.01) | |
| *G21D 5/02* | (2006.01) | |

(52) U.S. Cl.
CPC .............. *G21C 15/12* (2013.01); *G21C 15/18* (2013.01); *G21C 15/182* (2013.01); *G21D 1/00* (2013.01); *G21D 5/02* (2013.01)

(58) Field of Classification Search
CPC ........ G21C 1/326; G21C 9/016; G21C 15/12; G21C 15/18; G21C 15/182; G21C 15/00; Y02E 30/00; Y02E 30/30
See application file for complete search history.

(56) References Cited

U.S. PATENT DOCUMENTS

| | | | | |
|---|---|---|---|---|
| 4,950,448 | A | * | 8/1990 | Gou ...................... G21C 15/18 376/283 |
| 5,610,962 | A | * | 3/1997 | Solorzano ................ G21C 9/04 376/461 |
| 2010/0260302 | A1 | * | 10/2010 | Pelisson ................. G21C 15/18 376/282 |
| 2012/0314830 | A1 | * | 12/2012 | Tauveron ............... G21C 1/028 376/386 |
| 2013/0145759 | A1 | | 6/2013 | Sonwane et al. |
| 2013/0170598 | A1 | * | 7/2013 | Komuro ................. G21C 9/016 376/280 |
| 2013/0223579 | A1 | * | 8/2013 | Allen ....................... G21C 7/14 376/219 |
| 2014/0334590 | A1 | * | 11/2014 | Kim ....................... G21C 13/02 376/282 |
| 2015/0049850 | A1 | * | 2/2015 | Hattori ..................... G21C 1/02 376/211 |
| 2016/0042816 | A1 | * | 2/2016 | Yi .......................... G21C 15/18 376/283 |
| 2016/0293281 | A1 | * | 10/2016 | Katono .................. G21C 9/012 |
| 2017/0301421 | A1 | * | 10/2017 | Abbott ................... G21C 1/328 |
| 2017/0316839 | A1 | * | 11/2017 | Bodner ................... G21C 5/02 |
| 2017/0316841 | A1 | * | 11/2017 | Abbott ................. G21C 15/243 |
| 2019/0206580 | A1 | * | 7/2019 | Walters .................... G21D 5/04 |

FOREIGN PATENT DOCUMENTS

| | | | |
|---|---|---|---|
| KR | 20140028538 A | 3/2014 | |
| KR | 101570080 B1 * | 11/2015 | ............. G21C 15/26 |
| WO | WO 2016/175363 A1 | 11/2016 | |
| WO | WO-2016175363 A1 * | 11/2016 | ............. G21C 15/18 |
| WO | WO 2017/080580 A1 | 5/2017 | |

* cited by examiner

[A-A']

[B-B']

[C-C']

COOLING FACILITY IN A REACTOR VESSEL AND ELECTRIC POWER GENERATION SYSTEM

CROSS-REFERENCE TO RELATED APPLICATION

Pursuant to 35 U.S.C. § 119(a), this application claims the benefit of the earlier filing date and the right of priority to Korean Patent Applications No. 10-2017-0064356, filed on May 24, 2017, the contents of which are incorporated by reference herein in their entirety.

BACKGROUND

1. Technical Field

The present disclosure relates to a method of cooling in a reactor vessel, and more particularly, to power production using the heat of a reactor coolant system during a normal operation, emergency power production using the heat of the reactor coolant system during an accident, and cooling in the reactor vessel.

2. Description of the Related Art

Nuclear reactors are divided into loop type reactors (e.g., commercial reactors: Korea) in which major components (steam generator, pressurizer, pump, etc.) are installed outside a reactor vessel and integral reactors (e.g., SMART reactors: Korea) in which the major components are installed inside a reactor vessel.

In addition, Nuclear power plants are divided into active plants and passive plants depending on the implementation of a safety system. An active plant is a reactor using an active component such as a pump operated by electric power of an emergency diesel generator (EDG) or the like to drive a safety system, and a passive plant is a plant using a passive component operated by gravity, gas pressure or the like to drive a safety system.

A passive safety system in a passive plant may maintain the reactor in a safe manner only with a natural force built in the system without an operator action or an AC power source of safety grade such as an emergency diesel generator for more than a period of time (72 hours) required by regulatory requirements in the event of an accident, After 72 hours, using an operator action and a non-safety systems might be allowed to maintain the function of the safety systems and an emergency DC power source (battery).

Unlike a general thermal power plant where heat generation is stopped when fuel supply is stopped, a reactor in a nuclear power plant generates residual heat from a reactor core for a significant period of time by a fission product produced and accumulated during a normal operation even when a fission reaction is stopped in the reactor core. Accordingly, a variety of safety systems for removing the residual heat of the core during an accident are installed in the nuclear power plant.

In case of an active nuclear power plant (Conventional Nuclear Power Plant of Korea), a plurality of emergency diesel generators are provided in preparation for a case of interruption of electric power supply from the inside or outside at the time in an accident, and most active nuclear power plants use a pump to circulate cooling water, and thus a large-capacity emergency AC power source (a diesel generator) is provided due to the high power requirements of those active components. An operator action allowance time for an active nuclear reactor is estimated about 30 minutes.

In order to exclude active components such as a pump that requires a large amount of electricity, a driven force such as gas pressure or gravity is introduced in a passive nuclear reactor (U.S. Westinghouse AP1000, Korean SMART) that has been developed or is being developed to enhance the safety of the nuclear power plant, and thus a large amount of power is not required other than small components such as a valve, which is essentially required for the operation of a passive safety system. However, to enhance the safety in a passive nuclear power plant, an operator action allowance time is drastically extended from 30 minutes to 72 hours or longer, and an emergency active power source (diesel generator) is excluded, and an emergency DC power source (battery) is adopted. And thus the emergency DC power source should be maintained for more than 72 hours. Therefore, the emergency power source capacity required per unit time in a passive nuclear power plant is relatively small compared to an active nuclear power plant, but it is very large in terms of the battery capacity because the emergency power should be supplied for 72 hours or more.

In the other hand, a residual heat removal system (auxiliary feedwater system or passive residual heat removal system) is employed as a system for removing the heat of a reactor coolant system (the sensible heat of the reactor coolant system and the residual heat of the core) using a residual heat removal heat exchanger connected to a primary system or secondary system when an accident occurs in various nuclear power plants including an integral reactor. (AP1000: U.S. Westinghouse, commercial loop type nuclear power plant and SMART reactor: Korea)

Furthermore, a safety injection system is employed as a system for directly injecting cooling water into the reactor coolant system in case of a loss-of-coolant accident to maintain a water level of the reactor core and removing the heat of the reactor coolant system (the sensible heat of the reactor coolant system and the residual heat of the core) using the injected cooling water. (AP1000: U.S. Westinghouse, commercial loop type and SMART reactor: Korea)

Moreover, a reactor containment cooling system or spray system is a system for condensing steam using cooling or spraying to suppress a pressure rise when a pressure inside the reactor containment rises due to an accident such as a loss-of-coolant accident or a steam-line-break accident. Additionally, there are a method of directly spraying cooling water into the reactor containment (commercial loop type reactor: Korea), a method of inducing steam discharged in the reactor containment into a suppression tank (commercial boiling water reactor), a method of using a heat exchanger installed inside or outside the reactor containment (reinforced concrete containment building)) ($APR_+$: Korea), a method of using a surface of the steel containment vessel as a heat exchanger (AP1000: U.S. Westinghouse), or the like.

As described above, various safety systems configured with multiple trains with two or more trains are installed in each system such as a residual heat removal system and a safety injection system for cooling the reactor coolant system (including the reactor vessel) to protect the reactor core at the time of an accident. However, in recent years, there has been a growing demand for safety enhancement of nuclear power plants due to the impact of Fukushima nuclear power plant (boiling water reactor) accident and the like, and thus there is a rising demand for safety facilities against a severe accident such as an external reactor vessel cooling system even in a pressurized water reactor (PWR) with a very low risk of leakage of large amounts of radioactive materials due to employing a very large-internal-volume nuclear reactor containment.

In detail, various safety facilities are provided to relieve an accident in case of the accident. In addition, each of the safety facilities is configured with multiple trains, and the probability that all systems fail simultaneously is very small. However, as a public requirement for the safety of nuclear power plants increases, safety facilities have been enhanced in preparation for a severe accident even with a very low probability of occurrence.

The external reactor vessel cooling system is a system provided to cool the outside of reactor vessel during core meltdown to prevent damage of the reactor vessel, assuming that a serious damage occurs in the core cooling function and a severe accident that the core is melted occurs since various safety facilities do not adequately perform functions due to multiple failure causes at the time of an accident. (AP1000 U.S. Westinghouse)

When the reactor vessel is damaged, a large amount of radioactive material may be discharged into the reactor containment, and a pressure inside the reactor containment may rise due to an large amount of steam generated by corium (melted core)-water reaction and gas formed by the core melt-concrete reaction. The reactor containment serves as a final barrier to prevent radioactive materials from being discharged into an external environment during an accident. When the reactor containment is damaged due to an increase in internal pressure, a large amount of radioactive material may be released to an external environment. Therefore, the external reactor vessel cooling system performs a very important function of suppressing radioactive materials from being discharged into the reactor containment and an increase of the internal pressure during a severe accident to prevent radioactive materials from being discharged into an external environment.

The external reactor vessel cooling system which is adopted in many countries is a system in which cooling water is filled in the reactor cavity located at a lower part of the reactor vessel and the cooling water is introduced into the cooling flow path in a space between the thermal insulation material and the reactor vessel and then steam is discharged to an upper part of the cooling flow path. In addition, a method of injecting a liquid metal at the time of an accident to mitigate the critical thermal flux phenomenon, a method of pressurized cooling water to induce single phase heat transfer, a method of modifying a surface of the external reactor vessel to increase the heat transfer efficiency, a method of forming a forced flow, and the like, may be taken into consideration.

On the other hand, supercritical power generation technologies have a history of about 100 years. Sulzer Bros (1948, Switzerland) proposed a supercritical power generation technology (using carbon dioxide) and Ernest G. Feher (1967, USA) developed the supercritical power generation technology (using carbon dioxide) for the first time, and researches on the supercritical power generation technology are being actively carried out in the USA, Japan, China, Korea, and the like.

Though still in the process of development and demonstration research in a small scale of several tens of MWe, the supercritical power generation technology is a technology that has been attracting attention from the viewpoint of the downsizing of turbine and an increase of power generation efficiency in the future owing to the development of a heat exchanger such as a printed circuit heat exchanger or the like. A supercritical power generation technology using a Brayton cycle method is a technology of heating a liquid compressed above a critical pressure in a heat exchanger (heating section) and injecting the heated liquid into the turbine, driving the turbine using an expansion force of the liquid, and producing electric power using a driving force, and carbon dioxide (critical temperature: 31.1, critical pressure: 7.4 MPa) which is easy to apply chemical and fluid (viscous) characteristics and a critical pressure is mainly used. The pressure of a fluid discharged from the turbine also maintains a relatively high pressure and the discharged fluid is cooled to a room temperature level through a heat exchanger (cooling section) and then supplied to the heat exchanger again from the compressor. By operating the compressor near the critical point, power required for compression is reduced, contributing to the improvement of power generation efficiency.

Because the supercritical power generation technology maintains a high pressure condition in all processes, it is possible to downsize greatly the size of the turbine, the compressor, the heat exchanger, and the like, and thus it is effective in a plant where space requirement is important. In particular, the components are downsized when applied to a safety system of a nuclear power plant, thereby facilitating the application of the strengthened seismic design basis.

In an external reactor vessel cooling system in the related art, since a thermal insulation material has to perform an appropriate thermal insulation function during a normal operation of the nuclear power plant, a flow path is sealed such that the inlet and outlet flow paths formed in the thermal insulating material at the time of an accident must be properly opened in a timely manner, and there is a delay time for filling the reactor cavity, and the heat removal ability may be reduced due to a critical heat flux phenomenon or the like while evaporating cooling water to form a steam layer on the external reactor vessel.

In addition, there is also a research on cooling the external reactor using a liquid metal, but the liquid metal method has difficulties in the maintenance of the liquid metal. In addition, the method of cooling the external reactor using a pressurization method has difficulties in the application of a natural circulation flow, and the method of modifying the reactor vessel surface has difficulties in the fabrication and maintenance of the surface, and the forced flow method has a disadvantage in that it must be supplied with electric power.

On the other hand, the steam turbine method has a larger size of facilities than the supercritical turbine method, thus increasing the cost when the strengthened seismic design basis is applied thereto. In addition, since the external reactor vessel cooling system is operated by an operator action at the time of an accident, various instruments and components for monitoring the accident are required for the operation, and a probability that a system in a standby mode fails to operate at the time of an accident is higher than a probability that a system being operated is stopped to operate at the time of an accident.

Accordingly, the present disclosure presents an in-vessel cooling and power generation system in which a large-scale turbine power generation facility in the related art is maintained almost same design, and a small-scale power generation facility including supercritical power generation is additionally installed to receive heat discharged from the reactor vessel during a normal operation or during an accident of the nuclear power plant.

SUMMARY

An object of the present disclosure is to provide an in-vessel cooling and power generation system having system reliability in which safety class or seismic design are easily applicable, and in-vessel cooling is carried out while continuously operating during a normal operation as well as during an accident to produce emergency power.

Another object of the present disclosure is to propose an in-vessel cooling and power generation system having enhanced safety in which residual heat of a certain scale or more is removed during a normal operation as well as during an accident.

Still another object of the present disclosure is to propose a nuclear power plant having economic efficiency and safety due to the downsizing and reliability enhancement of an emergency power system of the nuclear power plant.

An in-vessel cooling and power generation system according to the present disclosure may include a reactor vessel, a heat exchange section provided inside the reactor vessel, and formed to supply supercritical fluid to receive heat from a reactor coolant system in the reactor vessel, an electric power production section comprising a supercritical turbine formed to produce electric energy using the energy of the supercritical fluid whose temperature has increased while receiving heat from the reactor coolant system, and a cooling section configured to exchange heat with the supercritical fluid discharged by driving the supercritical turbine to shrink a volume of the supercritical fluid, wherein the supercritical fluid that has received heat from the reactor coolant system is formed to circulate through the heat exchange section, the electric power production section, and the cooling section.

According to an embodiment, the power generation system may be operated even during a normal operation and during an accident of a nuclear power plant to produce electric power.

According to an embodiment, the electric power produced during the normal operation of the nuclear power plant may be formed to be supplied to an internal and external electric power system and an emergency battery. Furthermore, the electric energy charged in the emergency battery may be formed to be supplied as an emergency power source during a nuclear accident.

According to an embodiment, the electric power produced during an accident of the nuclear power plant may be formed to be supplied to an emergency power source of the nuclear power plant. The emergency power source may be formed to be supplied to a power source for the operation of a nuclear safety system or valve switching for the operation of the nuclear safety system or monitoring the nuclear safety system or driving the in-vessel cooling and power generation system during an accident of the nuclear power plant.

According to an embodiment, a seismic design of seismic category I, II or III may be applied thereto, and a safety grade of safety class 1, 2 or 3 may be applied thereto.

According to an embodiment, the supercritical turbine may use the expansion energy of the supercritical fluid.

According to an embodiment, the heat exchange section may further include a core catcher, and the core catcher may be formed to receive and cool a core melt when melting the core inside the reactor vessel.

According to an embodiment, the system may further include a first injection section connected to an in-containment refueling water storage tank (IRWST) to supply refueling water to the heat exchange section. Furthermore, a first discharge section may be provided in a pipe connecting the heat exchange section and the electric power production section, and the first discharge section may be formed to discharge the refueling water supplied from the in-containment refueling water storage tank (IRWST).

According to an embodiment, the cooling section may include a fan or a pump, and the fan or the pump may be formed to supply a cooling fluid to the cooling section to exchange heat with the supercritical fluid. Furthermore, the cooling fluid may include air, pure water, seawater, or a mixture thereof.

According to an embodiment, the system may further include a compression section connected to the cooling section, wherein the compression section is formed to increase a pressure of the supercritical fluid whose volume is shrunk in the cooling portion.

According to an embodiment, the system may further include a recuperator section between the electric power production section and the cooling section, wherein the recuperator section is formed in which the supercritical fluid discharged from the electric power production section and the supercritical fluid that has passed through the cooling section exchange heat with each other.

According to an embodiment, the system may further include an external reactor vessel cooling section formed to surround at least a part of the reactor vessel and formed to cool heat discharged from the reactor vessel. At least a part of the shape of the external reactor vessel cooling section may include a cylindrical shape, a hemispherical shape, a double vessel shape, or a mixed shape thereof.

According to an embodiment, the system may further include a second injection section connected to an in-containment refueling water storage tank (IRWST) to supply refueling water to the external reactor vessel cooling section. Furthermore, the system may further include a second discharge section in the external reactor vessel cooling section, and the second discharge section may be formed to discharge the refueling water supplied from the in-containment refueling water storage tank (IRWST).

According to an embodiment, the heat exchange section or the cooling section may include a heat exchanger, and the heat exchanger may include a printed circuit heat exchanger.

A nuclear power plant according to the present disclosure may include a reactor vessel, a heat exchange section provided inside the reactor vessel, and formed to supply supercritical fluid to receive heat from a reactor coolant system in the reactor vessel, an electric power production section comprising a supercritical turbine formed to produce electric energy using the energy of the supercritical fluid whose temperature has increased while receiving heat from the reactor coolant system, and a cooling section configured to exchange heat with the supercritical fluid discharged by driving the supercritical turbine to shrink a volume of the supercritical fluid, wherein the supercritical fluid is formed to circulate through the heat exchange section, the electric power production section, and the cooling section.

The in-vessel cooling and power generation system according to the present disclosure is formed to drive an electric power production section including a supercritical turbine formed to produce electric energy using the energy of a supercritical fluid in a small scale facility. A heat exchange section, an electric power production section and a cooling section of the present disclosure may continuously operate not only during normal operation but also during an accident to cool residual heat and generate emergency power, thereby improving system reliability. A heat exchange section for facilitating the application of safety class and seismic design with a small scale facility, and performing in-vessel cooling by the application of safety class or seismic design may be included therein, thereby improving the reliability of the nuclear power plant.

The in-vessel cooling and power generation system according to the present disclosure may be designed to remove residual heat of a certain scale or more from the reactor coolant system that has received heat generated from the core in the reactor vessel, and continuously operated not only during a normal operation but also during an accident to reduce a probability of actuation failure at the time of an accident, thereby improving the safety of the nuclear power plant.

The nuclear power plant according to the present disclosure may improve the economic efficiency of the nuclear power plant through the downsizing of an emergency power system through the in-vessel cooling and power generation system.

DETAILED DESCRIPTION OF THE EMBODIMENTS

Figure 1A:
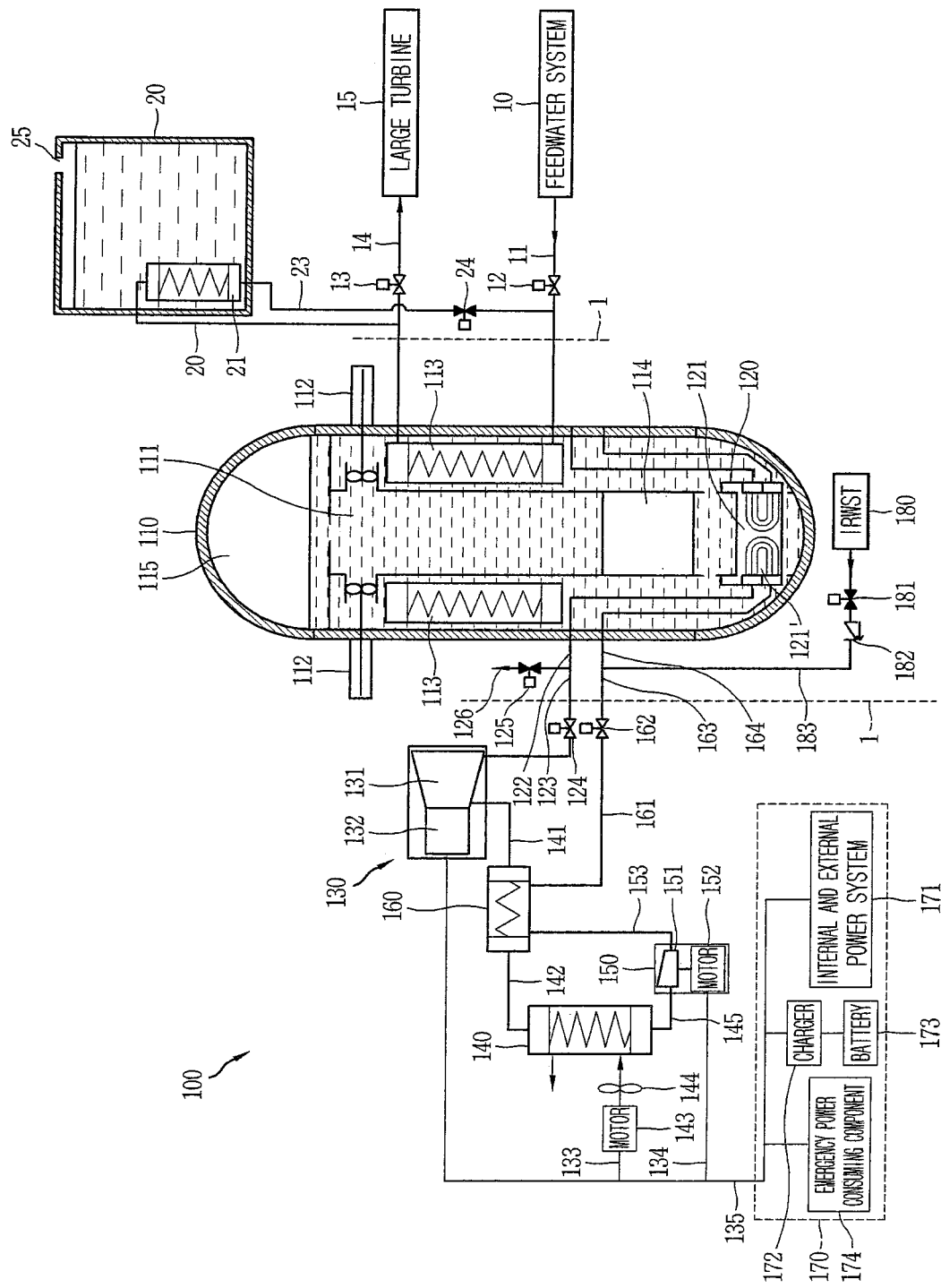
FIG. 1A is a conceptual view of an in-vessel cooling and power generation system associated with an embodiment of the present disclosure.

Hereinafter, preferred embodiments of the present disclosure will be described in detail with reference to the accompanying drawings, and the same or similar elements are designated with the same numeral references regardless of the numerals in the drawings and their redundant description will be omitted. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings.

It will be understood that although the terms first, second, etc. may be used herein to describe various elements, these elements should not be limited by these terms. These terms are generally only used to distinguish one element from another.

A singular representation may include a plural representation unless it represents a definitely different meaning from the context.

Terms "include" or "has" used herein should be understood that they are intended to indicate an existence of several components or several steps, disclosed in the specification, and it may also be understood that part of the components or steps may not be included or additional components or steps may further be included.

FIG. 1A is a conceptual view of an in-vessel cooling and power generation system 100 associated with an embodiment of the present disclosure.

According to an embodiment of the present disclosure, the reactor vessel 110 may be configured such that reactor coolant is circulated and the inside of the reactor vessel 110 is provided with a core 114. The core 114 refers to a nuclear fuel. The reactor vessel 110 may be a pressure vessel designed to withstand high temperatures and pressures because electric power is produced by heat generated while performing fission in the core 114.

Even when a control rod is inserted into the core 114 to stop the core 114 during a nuclear power plant accident, residual heat may be generated for a considerable period of time. When it is assumed that various safety and non-safety systems do not operate at the time of an accident of the nuclear power plant, cooling water inside the reactor vessel 110 may be lost to increase the temperature of the nuclear fuel, thereby causing a core meltdown phenomenon.

On the other hand, during a normal operation of the nuclear power plant, heat may be received from the reactor coolant system 111 to produce steam. The steam generator 113 may be a pressurized water reactor. Further, the steam produced by the steam generator 113 may be steam that is phase-changed by receiving water a feedwater system 10 through a main feedwater line 11 and an isolation valve 12 connected thereto. The steam produced by the steam generator 113 is passed through a main steam line 14 connected to an isolation valve 13 and supplied to a large turbine 15 and a large generator (not shown) to produce electric power while the fluid energy of the steam is converted into electric energy through mechanical energy. However, although the pressurized water reactor is illustrated in the present disclosure, the technology of the present disclosure is not limited to the pressurized water reactor.

In addition, a reactor coolant pump 112 may circulate coolant that fills the inside of the reactor vessel 110. A pressurizer 115 provided inside the reactor vessel 110 may be formed to control the pressure of the reactor coolant system 111.

Moreover, a passive residual heat removal system including an emergency cooling water storage section 20 and a heat exchanger 21 may be provided therein to discharge the heat of the reactor coolant system 111 to the emergency cooling water storage section 20 through the steam generator by natural circulation due to a two-phase flow received through lines 22, 23 and the opening and closing of a valve 24 during an accident. Further, when steam is generated while emergency cooling water is evaporated by heat transferred to the emergency cooling water storage section 20, the steam may be released through a steam discharge section 25 to discharge the transferred heat to the atmosphere.

The in-vessel cooling and power generation system 100 is in an actuation state even during a normal operation and heat is continuously transferred to the reactor coolant system 111 by residual heat generated from the core 114 until the temperature of the reactor vessel 110 is significantly reduced to reach a safe state, and thus the in-vessel cooling and power generation system 100 continues to operate. Accordingly, an operator action for the operation of the external reactor vessel cooling system, various measuring instruments and control systems, valve operation or pump start and the opening and closing of a thermal insulation material may not be required as in a conventional method, and thus a probability of actuation failure of the in-vessel cooling and power generation system 100 is greatly reduced to improve the safety of the nuclear power plant.

In addition, since emergency power can be stably produced by the in-vessel cooling and power generation system 100 until the temperature of the reactor vessel is reduced to reach a safe state during an accident, the capacity of an emergency DC battery may be decreased to improve the economic efficiency of the nuclear power plant and improve the reliability of an emergency power system of the nuclear power plant by securing the emergency power supply means of a safety system, thereby improving the safety of the nuclear power plant.

In detail, in case of a passive nuclear power plant, emergency power required during an accident is less than about 0.05% compared to the power generation capacity generated from the nuclear power plant during a normal operation, but it is designed to use battery for 72 hours or more, and thus a very large sized battery is required, having a disadvantage of increasing the cost. However, the in-vessel cooling and power generation system 100 may produce an appropriate level of emergency power using residual heat continuously generated from the core 114 (an amount of residual heat generated is several % (initial shutdown) to 1/several % (after 72 hours subsequent to shutdown) compared to a normal amount of thermal power).

Moreover, when power is produced using the in-vessel cooling and power generation system 100, the power production amount is several tens of kWe to several MWe, and the capacity is less than 1/several % compared to the feedwater system 10 and the large turbine 15 for a normal operation of the nuclear power plant. This system 100 has almost no influence on the operation of nuclear power plant, and therefore, even when this system 100 fails during a normal operation. Than is to say, this system 100 has a capacity less than 1/several %, so it has little effect on a nuclear power plant operation.

In addition, when power is produced using the in-vessel cooling and power generation system 100, it may be constructed in a small scale compared to the large capacity feedwater system 10 and the large turbine 15 for producing normal power, and therefore, it is easy to apply seismic design and safety class, and cost increase is not so great due to small facilities even when seismic design and safety class are applied.

Moreover, as supercritical turbine power generation facilities are introduced, the present disclosure may drastically reduce the size of general small turbines, and components and lines related thereto may also be downsized by applying a supercritical fluid.

Besides, even in the event of an accident, it operates continuously as a normal operation without any additional valve operation, and therefore, during an accident, the probability of actuation failure of valves, pumps, and the like for the actuation of the external reactor vessel cooling system in the related art, and the probability of actuation failure or breakdown due to an error measuring instruments and control signals may be significantly reduced. Moreover, when the heat exchange section 120 and the electric power production section 130 fail due to the occurrence of a severe accident, a flow path through the in-containment refueling water storage tank (hereinafter, referred to as IRWST) 180 and the first discharge section 126 is already formed, and therefore, it may be formed to efficiently supply and discharge a flow rate of cooling water by a simple operation such as opening or closing a valve according to an operator action, and used for the cooling of the reactor coolant system 111 and core melt including the reactor vessel 110.

In particular, in case of an integral reactor, a lower space of the inner reactor vessel has a simple structure, and the lower or other space of the inner reactor vessel is easily secured, and thus it is easier to apply the in-vessel cooling and power generation system 100 of the present disclosure.

In addition, the in-vessel cooling and power generation system 100 may be used as an additional residual heat removal means that performs the role of removing the residual heat of the reactor core 114 during an accident.

Hereinafter, the in-vessel cooling and power generation system 100 according to the present disclosure will be described in detail.

The inside of the reactor containment boundary 1 may include a reactor vessel 110, a heat exchange section 120, and an IRWST 180.

The heat exchange section 120 may be provided inside the reactor vessel 110 and spaced apart from a lower part of the core 114. The heat exchange section 120 may be formed to circulate a supercritical fluid to receive heat from the reactor coolant system 111 that has received heat discharged from the core 114.

On the other hand, the outside of the reactor containment boundary 1 includes an electric power production section 130, a cooling section 140, and a compression section 150. The electric power production section 130 may be connected to the motors 141, 152 and the power system 170 to supply power. The power system 170 may include an internal and external electric power system 171, a charger 172, an emergency power consuming component 174, and an emergency battery 173. However, some of the components illustrated as being installed outside the reactor containment boundary 1 may be disposed inside the reactor containment boundary 1 depending on the layout characteristics of the nuclear power plant.

The reactor vessel 110 formed inside the reactor containment boundary 1 may be a pressure vessel formed to circulate the reactor coolant of the reactor coolant system 111 and formed to include the core 114 therein, and designed to withstand high pressures.

The heat exchange section 120 is provided inside the reactor vessel 110 to receive heat from the reactor coolant system 111 inside the reactor vessel 110. In detail, the heat exchange section 120 may be formed to circulate a supercritical fluid capable of receiving heat from the reactor coolant system 111 to perform cooling in the reactor vessel 110. In other words, the heat exchange section 120 may perform cooling on reactor coolant inside the reactor vessel 110 during the normal operation of the nuclear power plant, and perform cooling on reactor coolant and core melt during a nuclear power plant accident.

Referring to the layout of the detailed structures 121, 121' of the heat exchange section 120, the heat exchange section 120 may include an inlet header arranged with inlets into which the supercritical fluid is injected, and an outlet header arranged with outlets from which the supercritical fluid is discharged, and an inner flow path for exchanging heat with the supercritical fluid. Furthermore, a core catcher may be formed as an arrangement of the additional structure 121 of the heat exchange section 120 so as to receive and cool the melt of the core 114 during a severe accident. The detailed description of the heat exchange section 120 will be described later with reference to FIGS. 3A through 3C and 4A through 4C.

In addition, the heat exchange section 120 is provided with a discharge pipe 122, and the discharge pipe 122 may be connected to the heat exchange section 120 and the electric power production section 130 to supply the fluid of the heat exchange section 120 to the electric power production section 130. The discharge pipe 122 may be branched to the pipe 123 and connected to the electric power production section 130 through the valve 124.

Moreover, the heat exchange section 120 may be connected to the IRWST 180 to supply refueling water through the first injection section 183. Specifically, the IRWST 180 may be connected to the valve 181 and the check valve 182. As a result, the discharge pipe 122 is provided with a first discharge section 126 connected to the valve 125 to discharge the refueling water supplied from the IRWST 180 to the first injection section 183 through the first discharge section 126 during an accident.

Specifically, the first discharge section 126 is configured to cool the inside of the reactor vessel 110 even when cooling and power generation using the reactor heat exchange section 120 and the electric power production section 130 is not carried out due to a failure thereof or the like during a severe accident on a pipe for discharging a fluid (gas/steam or liquid/hot water) from the heat exchange section 120 into the reactor containment (not shown), and the like.

Meanwhile, the supercritical fluid may be transferred and injected into the electric power production section 130 from the heat exchange section 120. The electric power production section 130 may be a supercritical turbine electric power generation section. The electric power production section 130 may include a supercritical turbine 131 configured to convert the expansion energy of the supercritical fluid whose temperature has increased while receiving heat from the reactor coolant system 111 to mechanical energy, and a small generator 132 connected to the supercritical fluid turbine 131 through a shaft to convert the mechanical energy (rotational power) into electric energy to produce electric power. The supercritical turbine 131 may receive heat with a predetermined scale from the inside of the reactor vessel 110 to produce electricity in consideration of characteristics during a normal operation and during an accident of the nuclear power plant.

According to an embodiment, the present disclosure may have a construction capable of variably generating power in consideration of a heat transfer rate due to heat generated in the core 114 supplied during an accident to control a load of the electric power production section 130 according to the heat transfer rate. In addition, the supercritical turbine 131 of the electric power production section 130 may be a small-capacity turbine, which makes it easy to apply seismic design or safety class described below.

The electric power that can be generated by the electric power production section 130 has a capacity of several tens of kWe to several MWe, which is less than 1% compared to the large-capacity feedwater system 10 and the large turbine 15 for producing the normal power of the nuclear power plant, and even when the facility operates or fails, there is little influence on the operation of the large capacity feedwater system 10 and the large turbine 15 for producing normal nuclear power.

In other words, the large capacity feedwater system 10 and the large turbine 15 for producing normal power are one of the biggest large-scale facilities of the nuclear power plant, and applying the seismic design and safety class above a certain scale to the whole facilities is very uneconomical because it causes a huge cost increase. In case of the in-vessel cooling and power generation system 100 to which the supercritical turbine 131 and the small generator 132 are applied, a size of the system 100 is much smaller than that of the feedwater system 10 and the large turbine 15, and thus it is easy to apply seismic design or safety class thereto, and the increased cost by applying seismic design or safety class is not so large. The supercritical turbine 131 and the small generator 132 are continuously driven to supply emergency electric power even when it is difficult to supply electric power due to the occurrence of an earthquake in conventional plants since seismic design is applied to the in-vessel cooling and power generation system 100, and the supercritical turbine 131 and the small generator 132 are continuously driven to supply emergency power even when various accidents occur since safety class is applied to secure system reliability.

Considering that electric power required in case of a passive nuclear power plant during an accident is several tens of kWe though the emergency power has a difference according to the characteristics of the nuclear power plant, sufficient power may be supplied with only electric power produced by the supercritical turbine 131 and the small generator 132. Besides, since the emergency DC battery capacity of a passive nuclear power plant is not greater than the emergency power required in an active nuclear power plant, the DC battery (emergency electric power source) may be recharged by electric power produced by the supercritical turbine 131 and the small generator 132.

The in-vessel cooling and power generation system 100 may be formed to have a seismic design of seismic category I, II or III specified by ASME (American Society of Mechanical Engineers). Specifically, seismic category I is applied to structures, systems and components classified as safety items, and should be designed to maintain an inherent "safety function" in case of a safe shutdown earthquake (SSE), and the safety function is maintained even under the operating basis earthquake (OBE) in synchronization with a normal operation load, and the appropriate allowable stresses and changes are designed to be within limits.

Though not requiring nuclear safety or continuous functions, seismic category II is applied to an item in which structural damages or interactions of the items may reduce the safety functions of seismic category I structures, systems and components or result in damage to the operator. In detail, seismic category II structures, systems and components are not required to have functional integrity for a safety shutdown earthquake, but required only to have structural integrity. In addition, seismic category II structures, systems and components should be designed and arranged so as not to impair the safety-related operation of seismic category I items.

Seismic category III is designed according to uniform building codes (UBCs) or general industrial standards according to the individual design function.

The in-vessel cooling and power generation system 100 may be configured to have a safety grade of safety class 1, 2 or 3 of the reactor plant specified by the American Society of Mechanical Engineers (ASME). In detail, the safety class of a nuclear power plant is typically divided into safety class 1 through safety class 3.

Safety class 1 is a class assigned to a RCS (reactor coolant system) pressure-boundary portion of a facility and its support that constitute a reactor coolant pressure boundary (a portion that may result in a loss of coolant beyond a normal make-up capacity of the reactor coolant in the event of a failure).

Safety class 2 may be assigned to a pressure-boundary portion of the reactor containment building and its support, and assigned to a pressure-resistant portion of a facility and its support that perform the following safety functions while not belonging to safety class 1.

A function of preventing the release of fission products or containing or isolating radioactive materials in the containment building A function of removing heat or radioactive materials generated in the containment building (e.g., containment building spray system), a function of increasing a negative reactivity to make the reactor in a subcritical state in case of an emergency or suppressing an increase of positive reactivity through a pressure boundary facility (e.g., boric acid injection system)

A function of supplying coolant directly to the core during an emergency to ensure core cooling (e.g., residual heat removal, emergency core cooling system) and a function of supplying or maintaining sufficient reactor coolant for cooling the reactor core during an emergency (e.g., refueling water storage tank)

Safety class 3 is not included in safety classes 1 and 2, and may be assigned to a facility that performs one of the following safety functions:

A function of controlling the concentration of hydrogen in the reactor containment building within the allowable limit A function of removing radioactive materials from a space (e.g., main control room, nuclear fuel building) outside the reactor containment building with safety class 1, 2 or 3 facilities A function of increasing a negative reactivity to make or maintain the reactor in a subcritical state (e.g., boric acid make-up)

A function of supplying or maintaining sufficient reactor coolant for core cooling (e.g., Reactor coolant replenishment system)

A function of maintaining a geometric structure inside the reactor to ensure core reactivity control or core cooling capability (e.g., core support structure)

A function of supporting or protecting the load for safety class 1, 2 or 3 facilities (concrete steel structures not included in KEPIC-MN, ASME sec. III).

A function of shielding for radiation for people outside the reactor control room or nuclear power plant A cooling function of spent fuel (e.g., spent fuel pool and cooling system)

A function of ensuring safety functions performed by safety class 1, 2 or 3 facilities (e.g., a function of removing heat from safety class 1, 2 or 3 heat exchangers, a safety class 2 or 3 pump lubrication function, a fuel supplying function of emergency diesel generator)

A function of supplying activation electric power or motive power to safety class 1, 2 or 3 facilities A function of allowing safety class 1, 2 or 3 facilities to provide information for manual or automatic operation required for the performance of safety functions or controlling the facilities A function of allowing safety class 1, 2 or 3 facilities to supply power or transmit signals required the performance of safety functions Manual or automatic interlocking function for safety class 1, 2 or 3 facilities to perform the safety functions A function of providing appropriate environmental conditions for safety class 1, 2 or 3 facilities and an operator A function corresponding to safety class 2 to which standards for the design and manufacture of pressure vessels, KEPIC-MN, ASME Sec. III, are not applied On the other hand, the cooling section 140 may be formed to exchange heat with the supercritical fluid discharged from the electric power production section 130 including the supercritical turbine 131 and the small generator 132 subsequent to producing electric energy, and shrink a volume of the supercritical fluid. In detail, the supercritical fluid discharged from the small generator 132 may be supplied to the cooling section 140 through the pipes 141, 142.

The heat exchanger type of the cooling section 140 may be a shell-and-tube heat exchanger or a plate heat exchanger. However, the type of the heat exchanger may not be limited thereto, and may be any heat exchanger capable of shrinking the volume of the supercritical fluid.

Furthermore, the cooling section 140 includes a motor 143 or a pump (not shown), and the motor 143 or the pump supplies cooling fluid to the cooling section 140 to exchange heat with the supercritical fluid. The cooling fluid may be air, pure water, seawater or a mixture thereof. The motor 143 may provide rotational power to the fan 144 or to the pump. The fan 144 may be a cooling fan when an air-cooling heat exchanger is applied, and may further include a cooling pump (not shown) for performing water cooling. The cooling section 140 may be downsized using the fan 144.

The foregoing motor 143 may be supplied with electric power produced by the electric power production section 130 itself through a connected line 133. The fan 144 connected to the motor 143 may supply cooling air to the cooling section 140 to efficiently perform heat exchange in the cooling section 140. In addition, the motor 143 may be provided to receive electric power produced by the electric power production section 130 and electric power charged in the emergency battery 173.

A pipe 145 may be provided between the cooling section 140 and the compression section 150 to transfer the supercritical fluid, and the supercritical fluid shrunk in the cooling section 140 is transferred to the compression section 150 along the pipe 145. In detail, the compression section 150 may include a compressor 151 and a motor 152 formed to increase the pressure of the supercritical fluid. The motor 152 may be formed to provide motive power to the compressor 151, and may receive power produced by the electric power production section 130 itself through the connected wiring 134. In addition, the motor 152 may be provided to charge electric power produced by the electric power production section 130 to the emergency battery 173, and receive electric power again from the emergency battery 173.

The supercritical fluid compressed by the compression section 150 may be transferred to a recuperator section 160 through the pipe 153. The recuperator section 160 may be formed to perform heat exchange between the supercritical fluid discharged from the electric power production section 130 and supplied to the cooling section 140 through the pipe 141 and the supercritical fluid compressed in the compression section 150 and discharged from the compression section 150 through the pipe 153. The temperature of the supercritical fluid supplied to the cooling section 140 is decreased through the heat exchange of the supercritical fluid discharged from the electric power production section 130 and the compression section 150, respectively, and the temperature of the supercritical fluid discharged from the compression section 150 is increased to preheat supercritical fluid supplied to the heat exchange section 120 without additionally having a pre-heater, and reduce the capacity of the cooling section 140 by cooling through the heat exchange process. The heat exchanger type of the recuperator section 160 is a shell-and-tube heat exchanger, a printing plate or plate heat exchanger, but the type of the heat exchanger is not limited thereto.

Meanwhile, the supercritical fluid discharged from the compression section 150 and passed through the recuperator section 160 may be supplied to the pipe 161. In addition, the supercritical fluid may be supplied to the pipes 163, 164 connected to the heat exchange section 120 through the valve 162 connected to the pipe 161. Accordingly, the in-vessel cooling and power generation system 100 may be formed to circulate the supercritical fluid that has received heat from the reactor coolant system 111 through the heat exchange section 120, the electric power production section 130, the recuperator section 160, and the cooling section 140, and through the compression section 150, the recuperator section 160, and the cooling section 140.

The power system 170 may be formed to use the power produced during the foregoing normal operation of the nuclear power plant as the power of the internal and external electric power system 171. In detail, the internal and external electric power system 171 may be a system for processing electricity supplied from an on-site large turbine generator, an electric power production section 130, an on-site diesel generator, and an external electric power grid.

In addition, electric energy may be stored in the emergency battery 173 through a charger 172, which is a facility for storing alternating current (AC) electricity supplied from the on-site, the outside, or the electric power production section 130 or the like. The emergency battery 173 may be a battery provided in a nuclear power plant on-site to supply emergency DC power used during an accident.

Moreover, the electric energy stored in the emergency battery 173 may be supplied to the emergency power consuming component 174 and used as an emergency power source. The emergency power source may be used as a power source for operating the nuclear power plant safety system or opening or closing a valve for the operation of the nuclear power plant safety system or monitoring the nuclear safety system during an accident of the nuclear power plant. Moreover, the electric power produced by the electric power production section 130 during an accident of the nuclear power plant may also be formed to be supplied to the emergency power source of the nuclear power plant.

Moreover, when the heat exchange section 120 and the electric power (electric power) production section 130 may do not work during the occurrence of a severe accident, a flow path through the IRWST 180 and the first discharge section 126 is already formed, and therefore, it may be formed to efficiently supply and discharge a flow rate of cooling water by a simple operation such as opening or closing a valve according to an operator action to cool the reactor vessel 110.

Figure 1B:
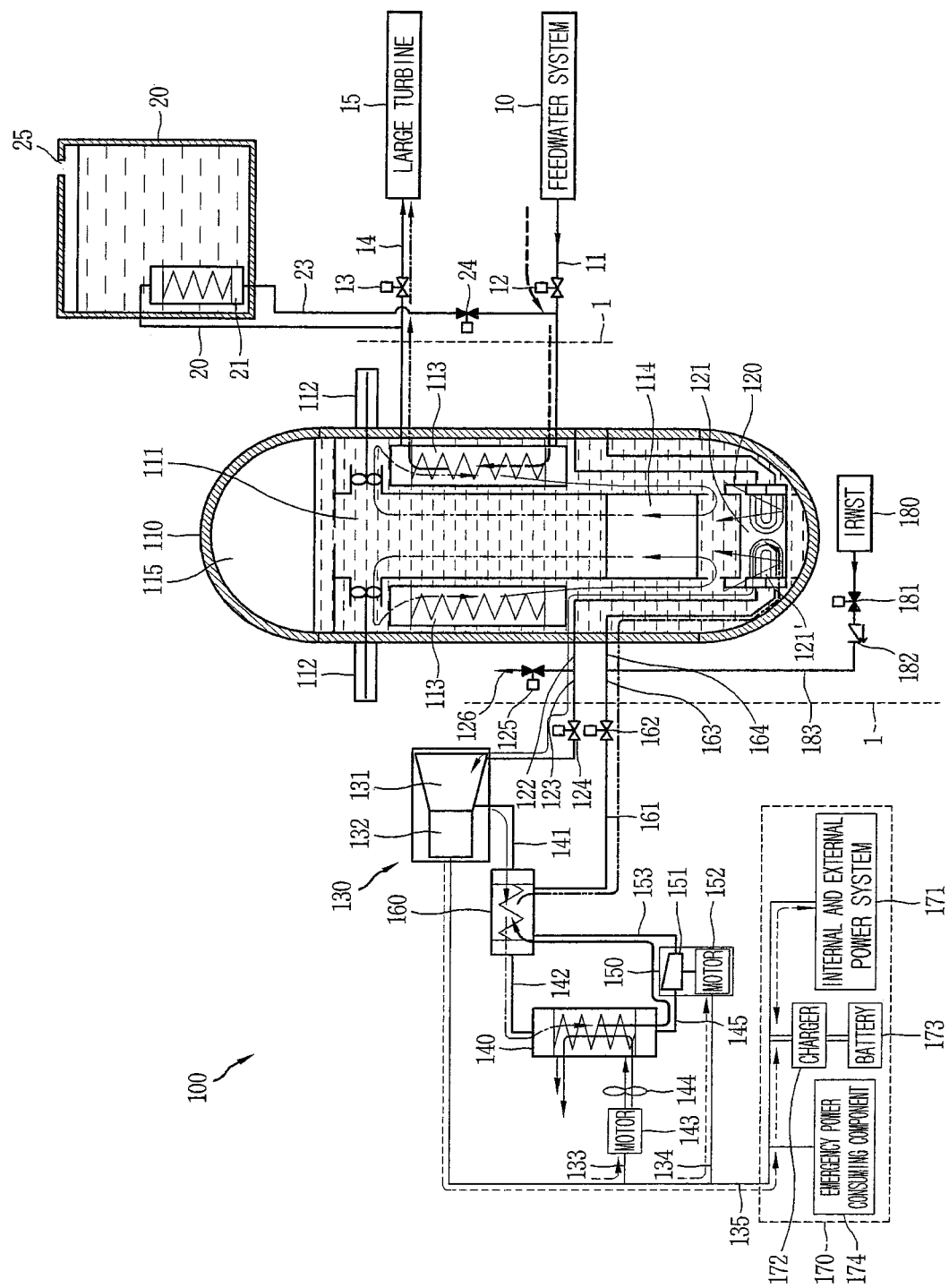
FIG. 1B is a conceptual view illustrating the operation of an in-vessel cooling and power generation system during a normal operation associated with an embodiment of the present disclosure.
Figure 1C:
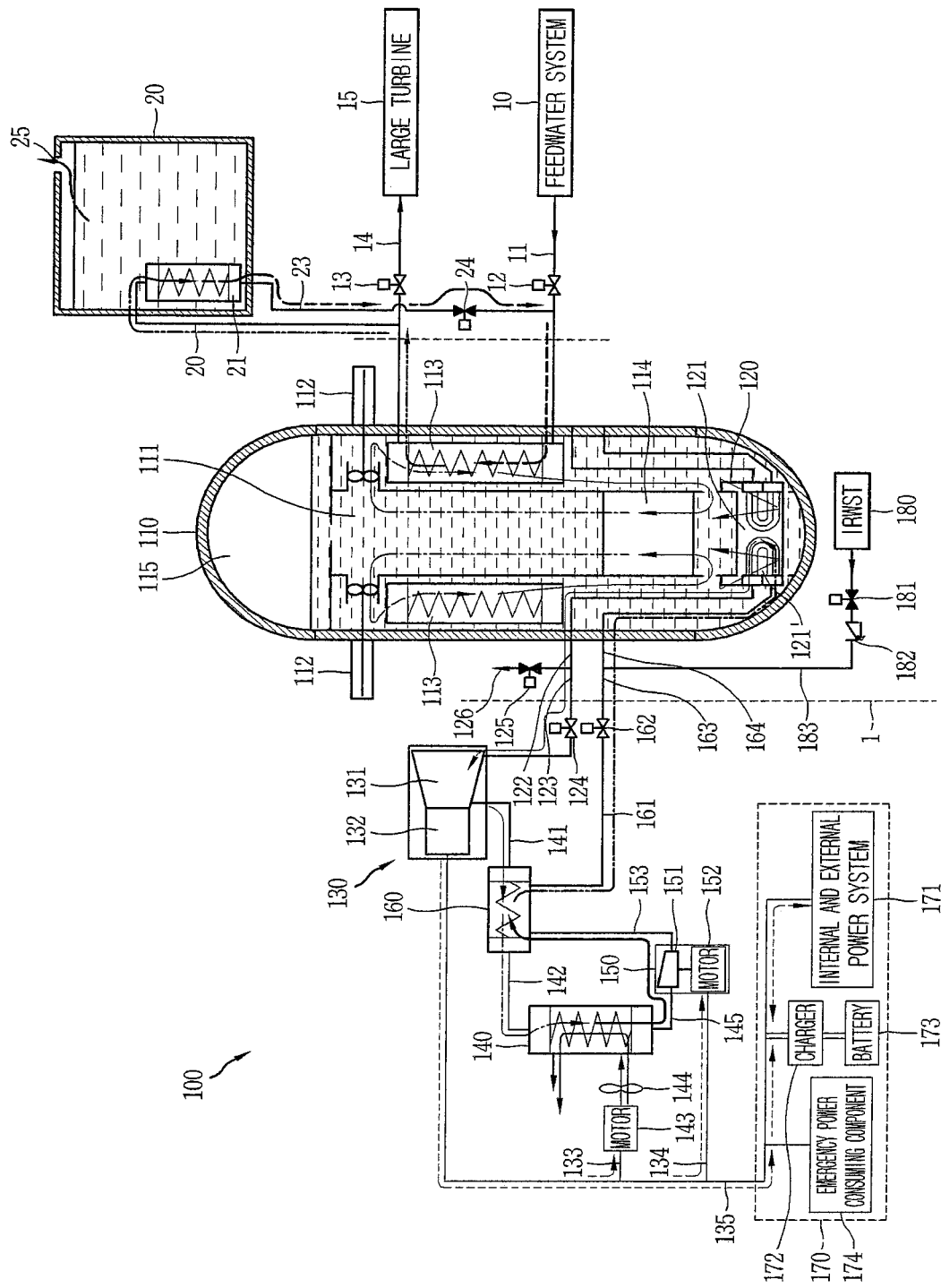
FIG. 1O is a conceptual view illustrating the operation of an in-vessel cooling and power generation system during a nuclear design basis accident associated with an embodiment of the present disclosure.
FIG. 1D is a conceptual view illustrating the operation of an in-vessel cooling and power generation system during a serious nuclear power plant accident associated with an embodiment of the present disclosure.

FIG. 1B is a conceptual view illustrating the operation of the in-vessel cooling and power generation system 100 during a normal operation of the nuclear power plant associated with an embodiment of the present disclosure.

Referring to FIG. 1B, it is a conceptual view illustrating system arrangement and supercritical fluid flow during a normal operation of the nuclear power plant. Main feedwater (water) is supplied from the feedwater system 10 to the steam generator 113, and heat received from the core 114 by the reactor coolant circulation of the reactor coolant system 111 is transferred the secondary system through the steam generator 113 to increase the temperature of the main feedwater and produce steam. The steam of the main feedwater produced from the steam generator 113 is supplied to the large turbine 15 along the main steam line 14 to rotate the large turbine 150 and rotate the large generator (not shown) connected through the shaft to produce electric power. The power produced through the large generator may supply electricity to an on-site or off-site from the power system.

Meanwhile, the heat exchange section 120 may be formed to receive some heat from the reactor coolant system 111 to allow the supercritical fluid to produce electric power from the electric power production section 130. In detail, a first temperature rise of the supercritical fluid may be carried out in the recuperator section 160, and then the heat may be supplied to the heat exchange section 120. The description of the recuperator section 160 will be described in detail later in the description.

The supercritical fluid may be supplied to the heat exchange section 120 through pipes 161, 163 to be heat-exchanged. As a result, a second temperature rise of the supercritical fluid may be carried out. The supercritical fluid compressed above a critical pressure while the temperature rises may be supplied to the electric power production section 130 including the supercritical turbine 131 and the small generator 132 along the discharge pipe 122. The supplied supercritical fluid may expand as the flow path area increases within the supercritical turbine 131. Accordingly, the supercritical turbine 131 is rotated by an expansion force formed as expanding the supercritical fluid, and the fluid energy of the supercritical fluid may be converted into mechanical energy. In addition, electric power may be produced while converting the mechanical energy into electric energy in the small generator 132 connected through the shaft.

Moreover, electric power produced by the electric power production section 130 may be formed to use the electric power as the electric power of the internal and external electric power system 171 through the power system 170. In addition, electric energy may be stored in the emergency battery 173 through a charger 172, which is a facility for storing alternating current (AC) electricity supplied from the on-site, the outside, or the electric power production section 130 or the like. The emergency battery 173 may be a battery provided in a nuclear power plant on-site to supply emergency DC power used during an accident. Further, the electric power may be supplied to the emergency power consuming component 174 and used as an emergency power source.

Meanwhile, the first cooling of the supercritical fluid expanded while being discharged subsequent to producing electric power in the small generator 132 of the electric power production section 130 and expanded while being transferred to the recuperator section 160 through the pipe 141 is carried out. In addition, the supercritical fluid may be supplied to the cooling section 140 through the pipe 142 to perform secondary cooling of the supercritical fluid. Accordingly, a volume of the supercritical fluid may be shrunk through the first and second cooling processes.

The supercritical fluid cooled and shrunk in the cooling section 140 may be supplied to the compression section 150 through the pipe 145. The compression section 150 may increase the pressure of the supercritical fluid whose volume is shrunk in the cooling section 140 based on the motive power of the motor 152. As the pressure of the supercritical fluid rises, the circulating power of the supercritical fluid of the in-vessel cooling and power generation system 100 may be provided.

Furthermore, the supercritical fluid pressurized above a critical pressure by the compression section 150 may be transferred to a recuperator section 160 through the pipe 153. The recuperator section 160 may be formed to perform heat exchange between the supercritical fluid discharged from the electric power production section 130 and supplied to the cooling section 140 through the pipes 141, 142 and the supercritical fluid compressed in the compression section 150 and discharged through the pipes 153, 161. Accordingly, the first temperature rise of the supercritical fluid discharged from the compression section 150 and supplied to the heat exchange section 120 may be carried out.

When low temperature fluid is injected at a high temperature into the reactor coolant system 111 and the heat exchange section 120, a thermal shock may occur. When the thermal shocks accumulate, the associated pipes and components may be damaged. Accordingly, the fluid supplied to the reactor coolant system 111 and the heat exchange section 120 must be heated to a proper temperature so as not to generate a thermal shock. Since the first temperature rise is carried out in the recuperator section 160 for the supercritical fluid supplied to the heat exchange section 120, the thermal shock may be eliminated without further providing a pre-heater.

In addition, the recuperator section 160 may reduce the capacity of the cooling section 140 by performing the first cooling of the supercritical fluid discharged from the electric power production section 130 and supplied to the cooling section 140.

As described above, during a normal operation of the nuclear power plant, the in-vessel cooling and power generation system 100 may be operated simultaneously with the nuclear power generation facility.

FIG. 10 is a conceptual view illustrating the operation of an in-vessel cooling and power generation system during a nuclear design basis accident associated with an embodiment of the present disclosure.

Referring to FIG. 10, it is a conceptual view of a case where the operation of the large turbine 15 is disabled due to the operation of the in-vessel cooling and power generation system 100 during a nuclear design basis accident.

Specifically, when an accident occurs in a nuclear power plant due to various causes, safety systems such as a passive residual heat removal system, a passive safety injection system and a passive containment cooling system, including the emergency cooling water storage section 20, which are installed in a plurality of trains, may operate automatically. Further, steam generated by the operation of the safety system may be discharged from the steam discharge section 25 of the emergency cooling water storage section 20.

The operation of the safety system may remove residual heat generated in the reactor coolant system 111 and the core 114. In addition, safety injection water is supplied to the reactor coolant system 111 to reduce the pressure and temperature of the reactor coolant system 111, reduce the temperature of the core 114, and suppress a pressure increase inside the reactor containment (not shown) by the operation of the passive containment cooling system to protect the reactor containment.

On the other hand, while the isolation valves 12, 13 provided in the main feedwater line 11 and the main steam line 14 are closed, the operation of the large turbine 15 is stopped. However, even when the reactor core 114 is stopped, residual heat is generated in the core 114 for a considerable period of time, and there is a lot of sensible heat in the reactor coolant system 111, and thus the temperature of the reactor coolant system 111 does not decrease rapidly.

Accordingly, even when an accident occurs, the heat exchange section 120 and the electric power production section 130 may be operated in the same state as normal operation. Therefore, the electric power production section 130 may cool the reactor coolant system 111 while continuously producing electric power. Over time, the temperature of the reactor coolant system 111 may decrease as the residual heat generated in the core 114 decreases. In this case, the in-vessel cooling and power generation system 100 may be operated in substantially the same manner as normal operation while reducing the amount of electric power generated by the electric power production section 130 in accordance with the reduction in the amount of heat transferred.

During a nuclear design basis accident as described above, the nuclear power generation facility is stopped and the in-vessel cooling and power generation system 100 operates. Accordingly, emergency power supply and residual heat removal may be efficiently carried out.

Figure 1D:
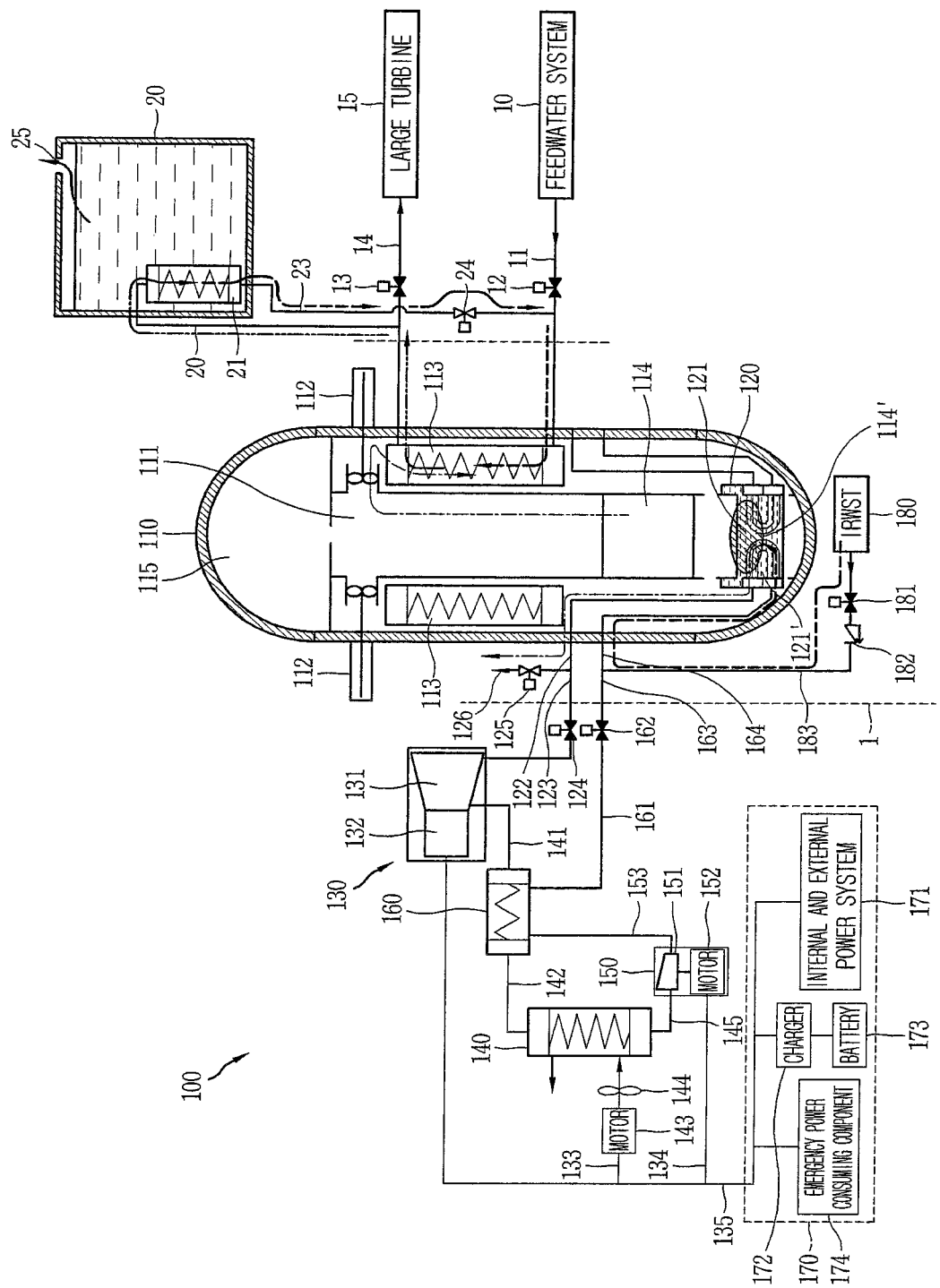

FIG. 1D is a conceptual view illustrating the operation of an in-vessel cooling and power generation system during a severe accident of the nuclear power plant associated with an embodiment of the present disclosure.

Referring to FIG. 1D, it is a conceptual view in which the operation of the in-vessel cooling and power generation system 100 is disabled due to a severe accident operation of the in-vessel cooling and power generation system 100. A safety system such as a passive residual heat removal system, a passive safety injection system, and a passive containment cooling system including the emergency cooling water storage section 20 installed in a plurality of trains by the related signals may be automatically operated as in the foregoing case of FIG. 10. However, when the probability of occurrence is extremely low, but various safety systems do not operate, it may occur an accident in which the core temperature rises and the fuel melts.

For example, in order to block the discharge of radioactive materials to the outside of the reactor containment when a severe accident such as the occurrence of the core melt 114' occurs during a nuclear accident, the operation of the heat exchange section 120 and the electric power production section 130 may be stopped. Accordingly, the first injection section 183 connected to the IRWST 180 may opened by the related signal or the operator's action to supply feedwater from the IRWST 180 to cool the core melt 114' inside the reactor vessel 110.

In detail, a flow path of the core melt 114' may be formed in the heat exchange section 120 to cool the core melt 114' by exchanging heat with the feedwater supplied from the IRWST 180. The heat exchange section 120 formed to receive and cool a melted material of the core 114 during a severe accident will be described later in detail with reference to FIGS. 3A through 3C and 4A through 4C.

Moreover, when a severe accident such as damage to the reactor vessel or exposure of the reactor core 114 occurs during a nuclear accident, in addition to the occurrence of the core melt 114' in the reactor, the operation of the heat exchange section 120 and the electric power production section 130 may be stopped to allow the opening of the valve 125 connected to the first discharge section 126 and the injection of feedwater through the IRWST 180 in a preventive point of view.

Furthermore, according to another embodiment described below, the same or similar reference numerals are designated to the same or similar configurations to the foregoing example, and the description thereof will be substituted by the earlier description.

During a nuclear severe accident as described above, the generation of power through the nuclear power generation facility and the in-vessel cooling and power generation system 100 is entirely stopped, and feedwater injection through the IRWST 180 and cooling through the first discharge section 126 are carried out. Accordingly, the emergency power production is stopped, but the cooling of the core melt 114' can be efficiently carried out.

Figure 2A:
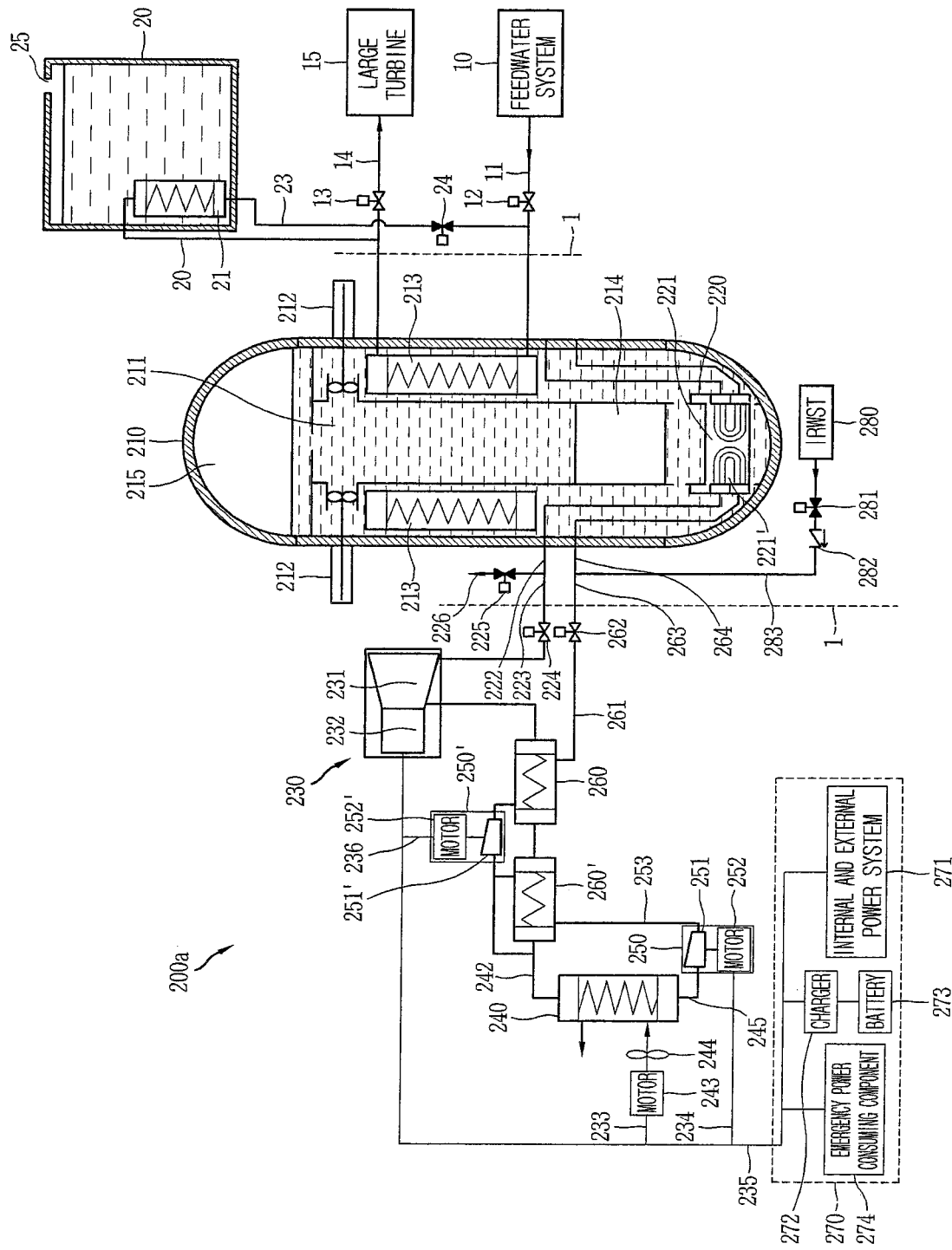
FIG. 2A is a conceptual view of an in-vessel cooling and power generation system associated with another embodiment of the present disclosure.

FIG. 2A is a conceptual view of an in-vessel cooling and power generation system 200a associated with another embodiment of the present disclosure.

Referring to FIG. 2A, the in-vessel cooling and power generation system 200a may be formed to include a plurality of recuperator sections and compression sections. In detail, supercritical fluid discharged from an electric power production section 230 may be supplied to a cooling section 240 through a first recuperator section 260 and a second recuperator section 260'.

In addition, a second compression section 250' may be further provided between the first recuperator section 260 and the second recuperator section 260', and the second compression section 250' may be provided with a compressor 251' and a motor 252' formed to increase a pressure of the supercritical fluid. The motor 252' may be formed to provide motive power to the compressor 251', and may receive power produced by the electric power production section 230 itself through the connected wiring 236. In addition, the motor 252 may be provided to charge electric power produced by the electric power production section 230 to the emergency battery 273, and receive electric power from the emergency battery 273.

Figure 2B:
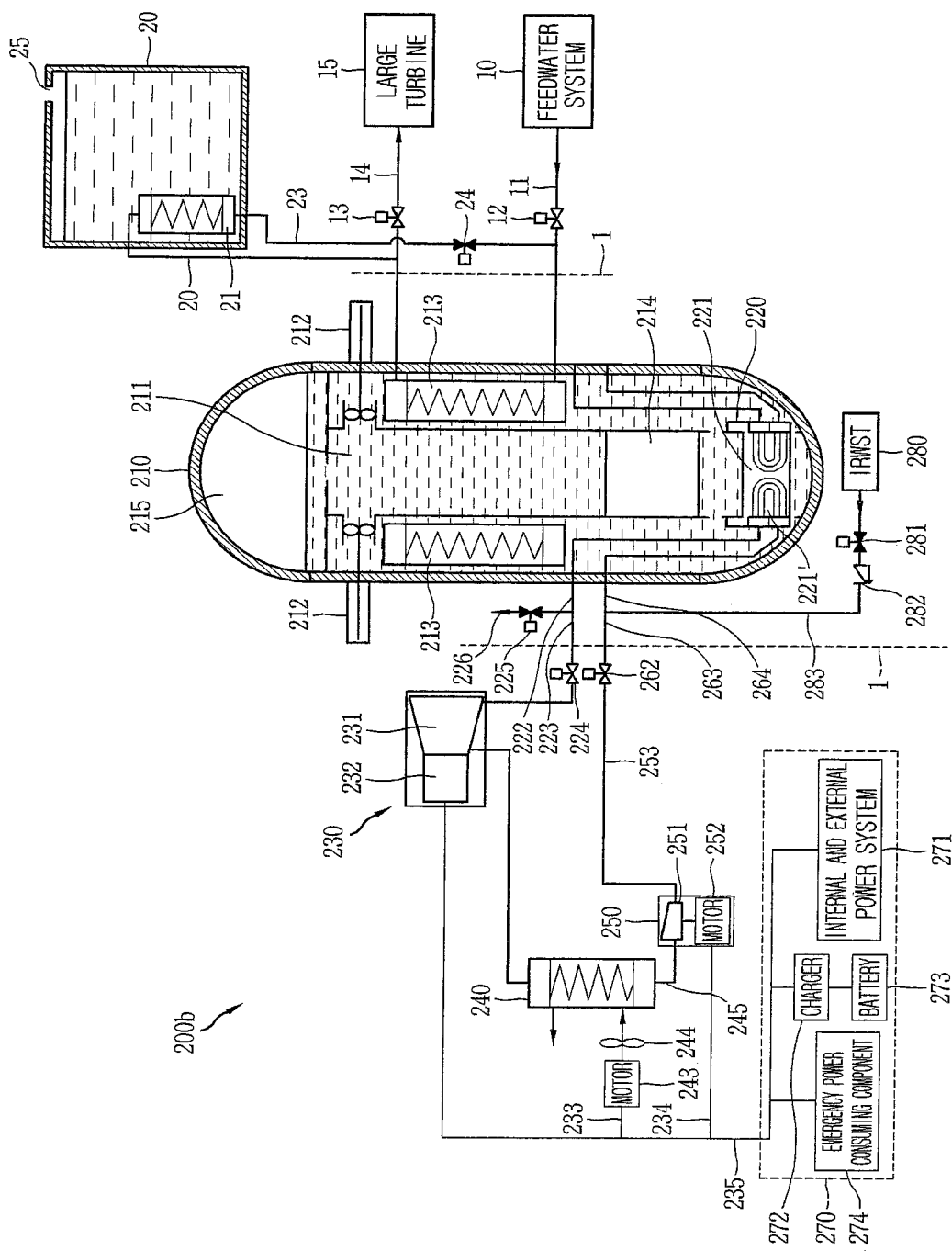
FIGS. 2B through 2D are conceptual views of an in-vessel cooling and power generation system associated with still another embodiment of the present disclosure.
Figure 2C:
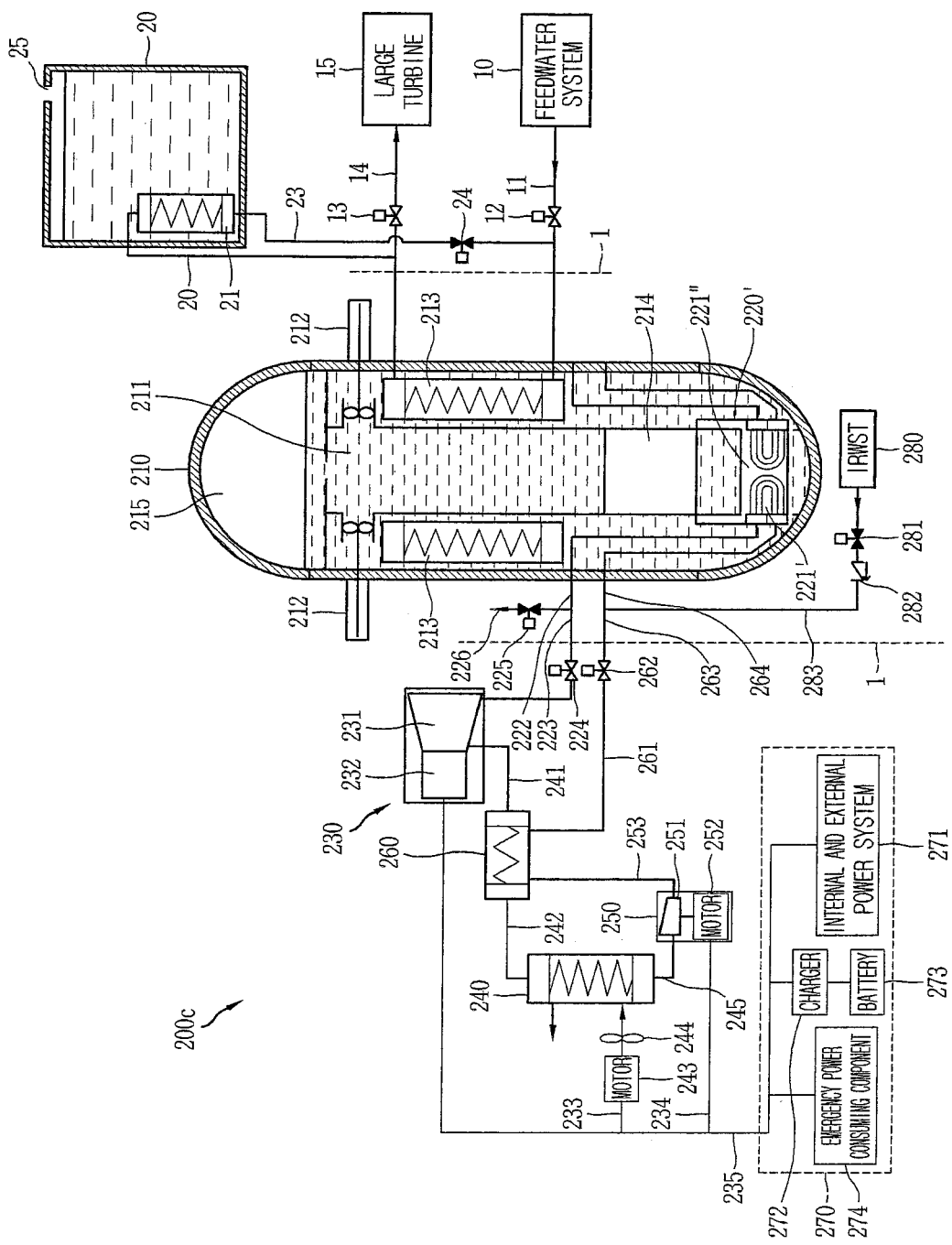
Figure 2D:
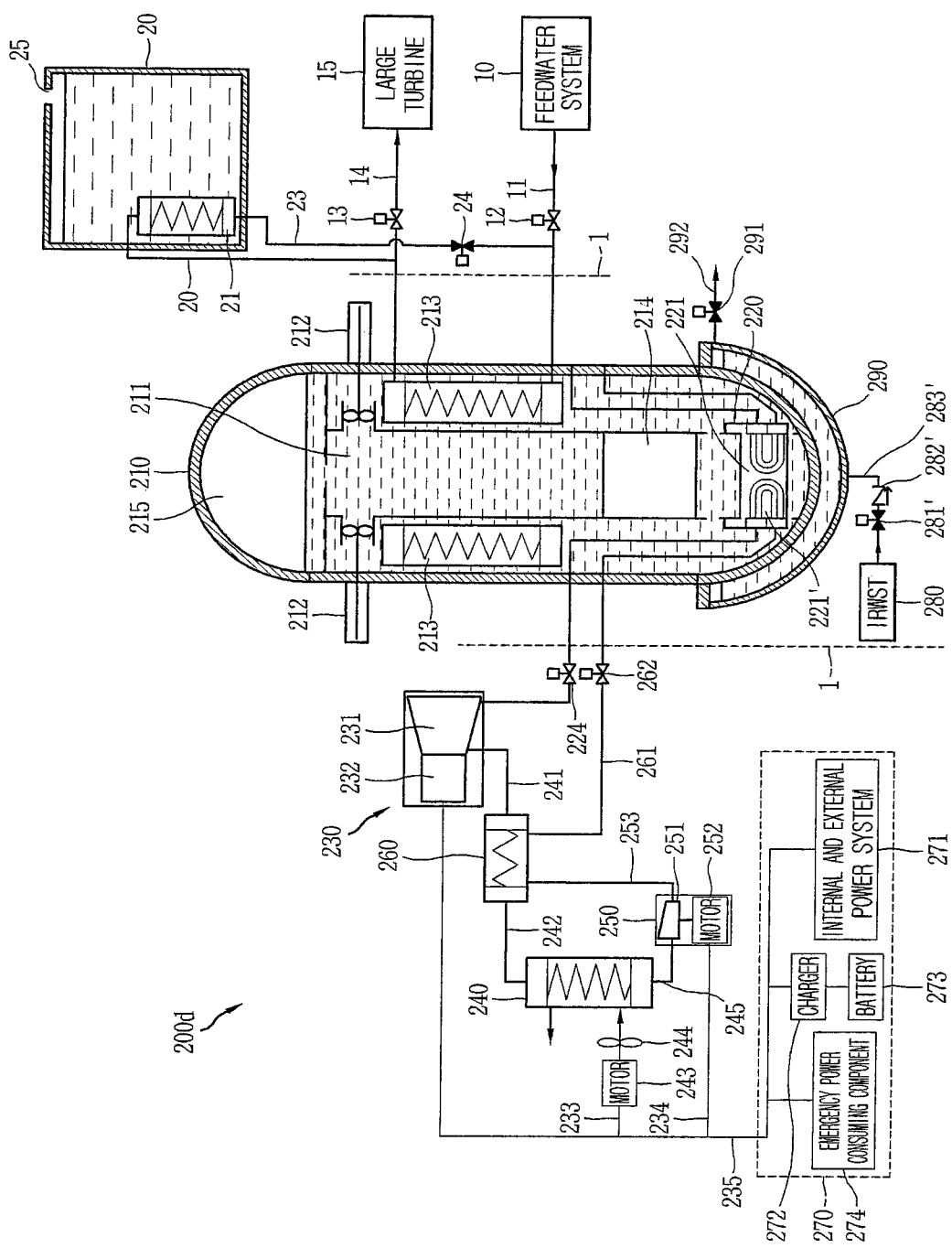

FIGS. 2B through 2D are conceptual views of an in-vessel cooling and power generation system 200b, 200c, 200d associated with still another embodiment of the present disclosure.

Referring to FIG. 2B, the in-vessel cooling and power generation system 200b is formed to circulate supercritical fluid through the heat exchange section 220, the electric power production section 230, the cooling section 240, and the compression section 250. Specifically, the in-vessel cooling and power generation system 200b may be operated to generate electric power when the nuclear power plant is operated during a normal operation or during an accident of the nuclear power plant even when the recuperator section is omitted according to the characteristics of the nuclear power plant.

Referring to FIG. 2C, the shape and layout of the heat exchange section 220' of the in-vessel cooling and power generation system 200c and its associated reactor coolant flow path may be freely designed according to the characteristics of the nuclear power plant. The shape of the heat exchange section 220' may be modified such that the structure 221" is disposed close to the core 214 as illustrated in FIG. 2C. The shape of the heat exchange section is not limited to that illustrated in FIG. 2C, and may be provided inside the reactor vessel 210, and formed to receive heat from the reactor coolant system 211 by supplying supercritical fluid.

Referring to FIG. 2D, the in-vessel cooling and power generation system 200d may be formed to separately further include an external reactor vessel cooling section 290. The external reactor vessel cooling section 290 may be formed to enclose the reactor vessel 210 and receive heat discharged from the reactor vessel 210 so as to cool the outer wall of the reactor vessel 210.

In detail, the shape of the external reactor vessel cooling section 290 may be hemispherical. However, the shape of the external reactor vessel cooling section 290 is not limited to a cylindrical shape, and at least a part of the shape of the external reactor vessel cooling section 290 may include a cylindrical shape, a hemispherical shape, a double vessel shape or a mixed shape thereof.

Additionally, a coating member (not shown) for preventing the external reactor vessel cooling section 290 from being corroded may be further formed. The surface of the coating member may be reformed in various ways, and may also be processed in an uneven shape (cooling fin) to increase the heat transfer surface area. Further, the surface of the coating member may further include a heat transfer member (not shown) that can be chemically treated to increase the surface area so as to improve heat transfer efficiency.

In addition, the external reactor vessel cooling section 290 may be connected to the IRWST 280 to supply refueling water through the second injection section 283'. Specifically, the external reactor vessel cooling section 290 may be connected to the valve 281' and the check valve 282'. Moreover, when a severe accident occurs, the external reactor vessel cooling section 290 may be provided with a second discharge portion 292 connected to a valve 291, and the second discharge section 292 may be formed to discharge the refueling water supplied from the IRWST 280. Specifically, the second discharge section 292 is configured to cool the reactor vessel even when cooling and power generation using the reactor heat exchange section 220 and the electric power production section 230 is disabled due to a failure thereof or the like during a severe accident on a pipe for discharging a fluid (gas/steam or liquid/hot water) from the external reactor vessel cooling system 290 into the reactor containment (not shown), and the like.

The in-vessel cooling and power generation system 200d may not separately include the first injection section or the first discharge section. However, the external reactor vessel cooling section 290 may be provided to cool the reactor vessel 210 independently. In this case, the cost is increased, but there is an advantage capable of eliminating an interference of outer wall cooling fluid with the supercritical fluid.

Figure 3A:
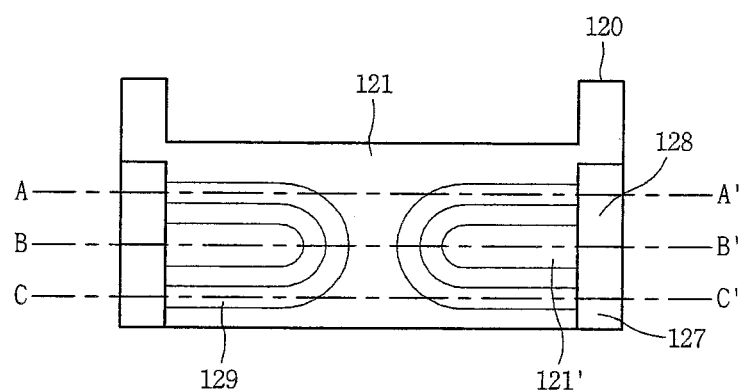
FIG. 3A is an enlarged view of the conceptual view of a heat exchange section in FIG. 1.
Figure 3B:
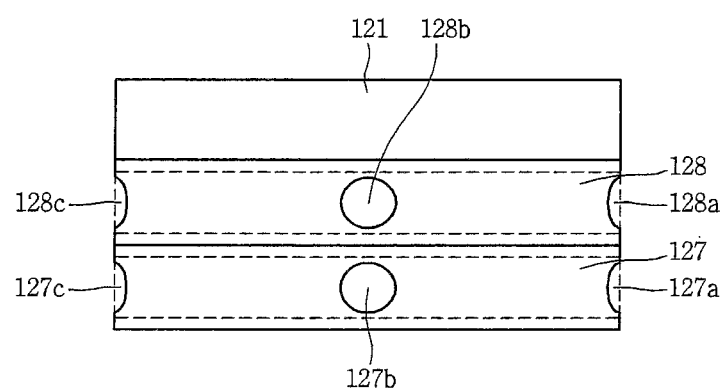
FIG. 3B is a side view of the heat exchange section in FIG. 1.
Figure 3C:
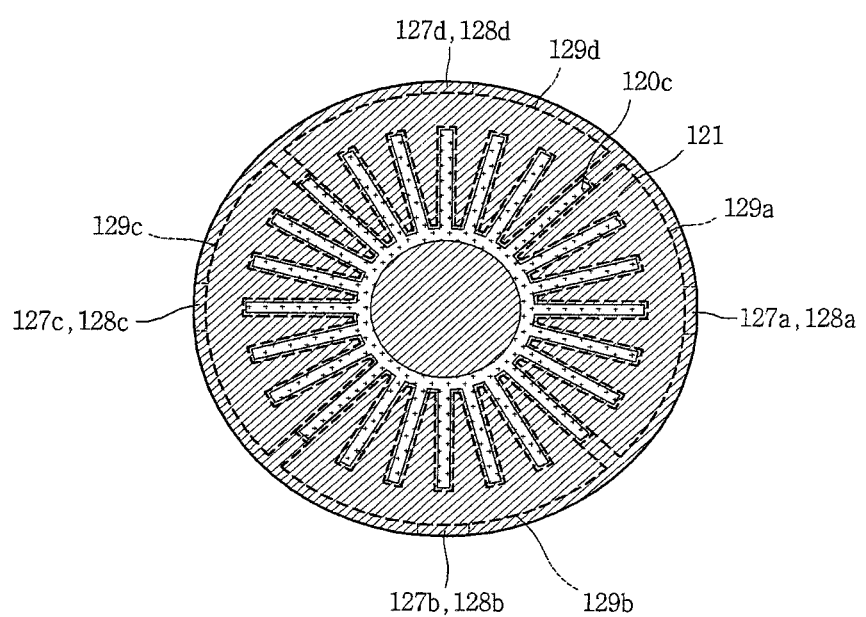
FIG. 3C is a top view of the heat exchange section in FIG. 1.

FIGS. 3A through 3C are views for specifically explaining the heat exchange section 120 in FIG. 1.

FIG. 3A is an enlarged view of the conceptual view of the heat exchange section 120 in FIG. 1.

FIG. 3B is a side view of the heat exchange section 120 in FIG. 1. FIG. 3C is a top view of the heat exchange section 120 in FIG. 1.

Referring to FIGS. 3A through 3C, the heat exchange section 120 may include an inlet header 127, an outlet header 128, an internal flow path 129, and structures 121, 121' for forming the internal flow path 129, and may be formed to include a core catcher including a core melt flow path 120c capable of receiving and cooling the core melt during a severe accident.

In detail, the heat exchange section 120 arranges the inlets 127a, 127b, 127c, 127d in the inlet header 127 to inject a fluid (supercritical fluid during a normal operation, IRWST refueling water during a severe accident) 129) into the internal flow path 129. In addition, the inner flow path 129 may be formed in a U-shape so as to surround the structure 121' so that fluid at low temperature surrounds the structure 121' and receives heat while rotating the structure 121' to increase the temperature. Further, the fluid having the increased temperature while passing through the internal flow path 129 may be discharged to the outlets 128a, 128b, 128c, 128d of the outlet header 128.

In detail, as illustrated in FIG. 3C, the heat exchange section 120 may be formed to allow the fluid to flow into the inlet 127a and be discharged to the outlet 128a through the flow path 129a. In addition, the inlets 127a through 127d may be formed to correspond to the flow paths 129a to 129d and the outlets 128a to 128d, respectively.

The core melt generated by the melting of the core during a severe accident may be cooled by the fluid (IRWST refueling water) while spreading radially from a central portion of the heat exchange section 120 to its edge along the core melt flow path 120c.

Figure 4A:
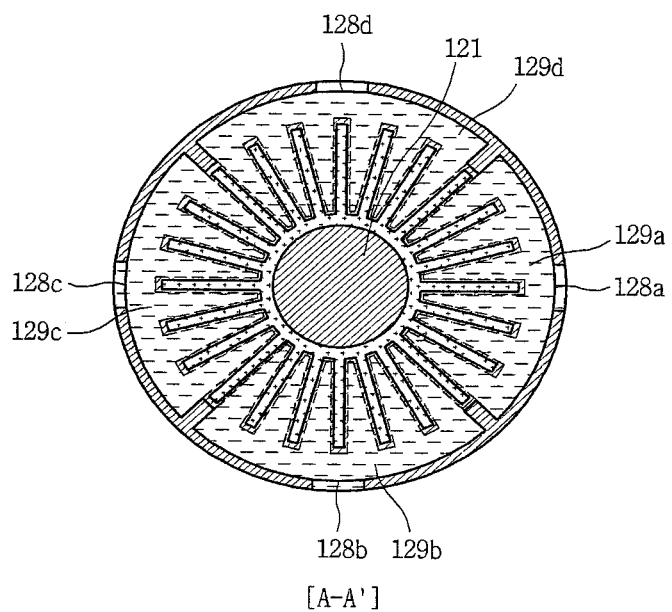
FIG. 4A is a top cross-sectional view of the heat exchange section cut along line A-A' in FIG. 3A.
Figure 4B:
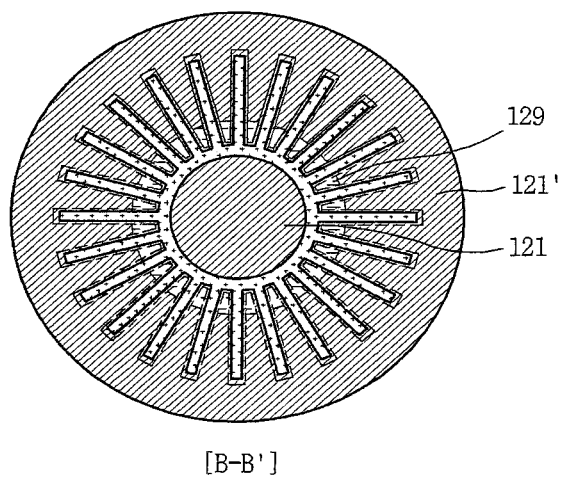
FIG. 4B is a middle cross-sectional view of the heat exchange section cut along line B-B' in FIG. 3A.
Figure 4C:
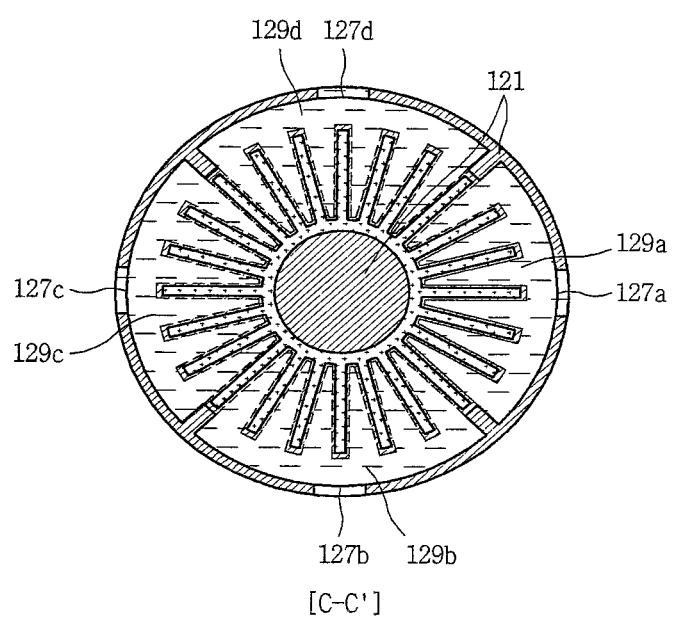
FIG. 4C is a bottom cross-sectional view of the heat exchange section cut along line C-C' in FIG. 3A.

FIGS. 4A through 4C are cross-sectional views taken along lines A-A', B-B' and C-C', respectively, of the heat exchange section 120 in FIG. 3A.

Specifically, FIG. 4A is a top cross-sectional view of the heat exchange section 120 cut along line A-A' in FIG. 3A. Referring to FIG. 4A, supercritical fluid having an increased temperature while passing through the flow paths 129a to 129d of the heat exchange section 120 cut along line A-A' may be formed to be discharged to the outlets 128a, 128b, 128c, 128d.

Furthermore, FIG. 4B is a middle cross-sectional view of the heat exchange section 120 cut along line B-B' in FIG. 3A. Referring to FIG. 4B, a fluid (supercritical fluid during a normal operation, refueling water during a severe accident) is formed to circulate upward from the bottom to the top while passing through the internal flow path 129 of the heat exchange section 120 cut along B-B', and the supercritical fluid is formed to receive heat while circulating upward so as to increase the temperature of the fluid.

Moreover, FIG. 4C is a bottom cross-sectional view of the heat exchange section 120 cut along line C-C' in FIG. 3A. Referring to FIG. 4C, the heat exchange section 120 may be formed such that the fluid having a low temperature flows into the inlets 127a, 127b, 127c, 127d of the heat exchange section 120 cut along the line C-C', and passes through the flow paths 129a through 129d to be discharged to the outlets 128a, 128b, 128c, 128d at an upper portion of the heat exchange section 120.

Although the present disclosure has been described in connection with the in-vessel cooling and power generation system of various embodiments of the present disclosure, the present disclosure is not limited to the in-vessel cooling and power generation system, and may include a nuclear power plant having the same.

In detail, the nuclear power plant of the present disclosure may include a reactor vessel, and a heat exchange section provided inside the reactor vessel to supply supercritical fluid to receive heat from the reactor coolant system in the reactor vessel so as to increase the temperature of the supercritical fluid. Furthermore, the nuclear power plant may include an electric power production section including a supercritical turbine formed to produce electric energy using an expansion force of the supercritical fluid above a critical pressure, whose temperature has increased while receiving heat from the reactor coolant system.

Moreover, the nuclear power plant may include a cooling section configured to exchange heat with the supercritical fluid discharged by driving the supercritical turbine to shrink a volume of the supercritical fluid. In addition, the cooling and power generation system may be formed to circulate the supercritical fluid that has received heat from the reactor coolant system through the heat exchange section, the electric power production section, and the cooling section.

It is obvious to those skilled in the art that the present disclosure can be embodied in other specific forms without departing from the concept and essential characteristics thereof.

Besides, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A reactor coolant system provided in a reactor vessel formed to accommodate the reactor coolant system comprising;
   a main feedwater system, connected to the reactor vessel, for producing the normal power of a nuclear power plant;
   a steam generator provided in the reactor vessel;
   a main turbine formed to produce electric power by using the steam generated by the steam generator as power; and
   provided with an in-vessel cooling and power generation system in the reactor vessel, which is formed to produce small-scale electric power smaller than electric power generated during normal operation of the nuclear power,
   wherein the in-vessel cooling and power generation system comprises:
   a first heat exchanger provided inside the reactor vessel and formed to receive a supercritical fluid that receives heat generated from a core in the reactor vessel;
   an electric power production section including a supercritical turbine formed to receive heat from the core and produce electrical power using the energy of the supercritical fluid whose temperature is increased; and
   a cooler that drives the supercritical turbine and heat-exchanges the discharged supercritical fluid to contract the volume of the supercritical fluid,
   wherein,
   the first heat exchanger is provided to be separated from the main feedwater system, the steam generator and the main turbine, and wherein
   the first heat exchanger, the electric power production section, and the cooler are connected to each other by a pipe, so that the supercritical fluid is circulated through the first heat exchanger, the electric power production section, and the cooler.

2. The system of claim 1, wherein a seismic design of seismic category I, II or III is applied thereto.

3. The system of claim 1, wherein a safety grade of safety class 1, 2 or 3 is applied thereto.

4. The system of claim 1, wherein the supercritical turbine uses the expansion energy of the supercritical fluid.

5. The system of claim 1, wherein the first heat exchanger further comprises a core catcher, and
   the core catcher is formed to receive and cool a core melt when melting the core inside the reactor vessel.

6. The system of claim 1, further comprising:
a second heat exchanger between the electric power production section and the cooler,
wherein the second heat exchanger is formed in which the supercritical fluid discharged from the electric power production section and the supercritical fluid that has passed through the cooler exchange heat with each other.

7. The system of claim 1, wherein
the first heat exchanger or the third heat exchanger comprises a printed circuit heat exchanger.

8. The system of claim 1, wherein the power generation system is operated not only during a normal operation but also during an accident of a nuclear power plant to produce electric power.

9. The system of claim 8, wherein the electric power produced during the normal operation of the nuclear power plant is formed to be supplied to an internal and external electric power system and an emergency battery.

10. The system of claim 9, wherein the electric energy charged in the emergency battery is formed to supply an emergency electric power as an emergency power source during an accident.

11. The system of claim 10, wherein the electric power produced during an accident of the nuclear power plant is formed to be supplied to an emergency power source of the nuclear power plant.

12. The system of claim 10 or 11, wherein the emergency power source is formed to supply an electric power for the operation of a nuclear safety system or valve manipulating for the operation of the nuclear safety system or monitoring the nuclear safety system or operation of the in-vessel cooling and power generation system during an accident of the nuclear power plant.

13. The system of claim 1, further comprising:
a first injection valve system comprising at least one valve connected to an in-containment refueling water storage tank (IRWST) to supply refueling water to the first heat exchanger.

14. The system of claim 13, wherein a first discharge valve system comprising at least one valve is provided in a pipe connecting the first heat exchanger and the electric power production section, and
the second discharge section is formed to discharge the refueling water supplied from the in-containment refueling water storage tank (IRWST).

15. The system of claim 1, wherein the cooler comprises a fan or a pump, and
the fan or the pump is formed to supply a cooling fluid to the cooler to exchange heat with the supercritical fluid.

16. The system of claim 15, wherein the cooling fluid comprises air, pure water, seawater, or a mixture thereof.

17. The system of claim 1, further comprising:
an external reactor vessel cooler formed to surround at least a part of the reactor vessel and formed to include a third heat exchanger to cool heat discharged from the reactor vessel.

18. The system of claim 17, wherein at least a part of the shape of the external reactor vessel cooler comprises a cylindrical shape, a hemispherical shape, a double vessel shape, or a mixed shape thereof.

19. The system of claim 17, further comprising:
a second injection valve system comprising at least one valve connected to an in-containment refueling water storage tank (IRWST) to supply refueling water to the external reactor vessel cooling section.

20. The system of claim 19, further comprising:
a second discharge valve system comprising at least one valve in the external reactor vessel cooling section, and
the second discharge valve system is formed to discharge the refueling water supplied from the in-containment refueling water storage tank (IRWST).

21. A nuclear power plant, comprising:
a reactor vessel formed to accommodate a reactor coolant system comprising;
a main feedwater system, connected to the reactor vessel, for producing the normal power of the nuclear power plant;
a steam generator provided in the reactor vessel;
a main turbine formed to produce electric power by using the steam generated by the steam generator as power; and
provided with an in-vessel cooling and power generation system in the reactor vessel, which is formed to produce small-scale electric power smaller than electric power generated during normal operation of the nuclear power,
wherein the in-vessel cooling and power generation system comprises:
a first heat exchanger provided inside the reactor vessel and formed to receive a supercritical fluid to receive heat generated from a core in the reactor vessel;
an electric power production section including a supercritical turbine formed to receive heat from the core and produce electrical power using the energy of the supercritical fluid whose temperature has increased; and
a cooler that drives the supercritical turbine and heat-exchanges the discharged supercritical fluid to contract the volume of the supercritical fluid,
wherein,
the first heat exchanger is provided to be separated from the main feedwater system, the steam generator and the main turbine, and
the first heat exchanger, the electric power production section, and the cooler are connected to each other by a pipe, so that the supercritical fluid is circulated through the first heat exchanger, the electric power production section, and the cooler.

* * * * *